United States Patent
Worthy

(10) Patent No.: US 7,374,184 B2
(45) Date of Patent: May 20, 2008

(54) PORTABLE TABLE FOR TABLE SAW

(76) Inventor: Michael W. Worthy, 401 Checotah Dr., Checotah, OK (US) 74426

( * ) Notice: Subject to any disclaimer, the term of this patent is extended or adjusted under 35 U.S.C. 154(b) by 234 days.

(21) Appl. No.: 11/155,919

(22) Filed: Jun. 17, 2005

(65) Prior Publication Data
US 2006/0284390 A1 Dec. 21, 2006

(51) Int. Cl.
B62B 1/00 (2006.01)
(52) U.S. Cl. ............... 280/43.12; 280/43.1; 280/43.24; 280/47.24
(58) Field of Classification Search ............... 280/43.1, 280/43.12, 43.24, 47.24
See application file for complete search history.

(56) References Cited

U.S. PATENT DOCUMENTS

| 2,139,470 | A | * | 12/1938 | Schmeiser | ............... 280/47.24 |
| 2,672,349 | A | | 3/1954 | Brock | |
| 3,224,790 | A | * | 12/1965 | Holstein | ................. 280/47.315 |
| 3,659,868 | A | * | 5/1972 | Tucker | ..................... 280/47.32 |
| 4,230,329 | A | | 10/1980 | Johnson | |
| 4,620,712 | A | * | 11/1986 | Blackwell | .................. 280/47.2 |
| 4,639,005 | A | * | 1/1987 | Birkley | ..................... 280/43.14 |
| 4,969,496 | A | | 11/1990 | Romans | |
| 4,971,286 | A | | 11/1990 | Silhan | |
| 5,479,840 | A | | 1/1996 | Hilliard et al. | |
| 5,482,303 | A | * | 1/1996 | Meloy | ..................... 280/43.17 |
| 5,709,397 | A | | 1/1998 | Hall | |
| 5,876,173 | A | | 3/1999 | English, Jr. | |
| 5,957,649 | A | | 9/1999 | English, Jr. et al. | |
| 6,079,931 | A | | 6/2000 | English, Jr. et al. | |
| 6,273,081 | B1 | | 8/2001 | Gorgol et al. | |
| 6,533,524 | B2 | | 3/2003 | English, Jr. et al. | |
| 6,659,706 | B2 | | 12/2003 | English, Jr. et al. | |
| 6,837,665 | B2 | | 1/2005 | English, Jr. et al. | |
| 7,077,421 | B2 | * | 7/2006 | Wu | ............................ 280/645 |

* cited by examiner

Primary Examiner—Christopher Ellis
Assistant Examiner—Katy Meyer
(74) Attorney, Agent, or Firm—William S. Dorman

(57) ABSTRACT

A portable table for supporting a table saw. The invention itself consists, essentially, of a pair of horizontal or longitudinal struts that extend above the ground or floor and across the lower ends of the legs of the table. On one end of each of the horizontal struts are mounted a pair of wheels which are slightly above ground when the table is standing in its normal condition. Also provided are a pair of horizontally extending handles which are attached to the table just below the upper surface thereof for the purpose of tilting the table when such action is desired.

Thus, the essence of the invention is a pair of wheels which are mounted to one side of the table in a non-touching relation with the ground. When the table is tilted, by lifting up on the handles, the wheels will touch the ground and permit the table to be lifted off the ground and wheeled to a convenient location.

2 Claims, 5 Drawing Sheets

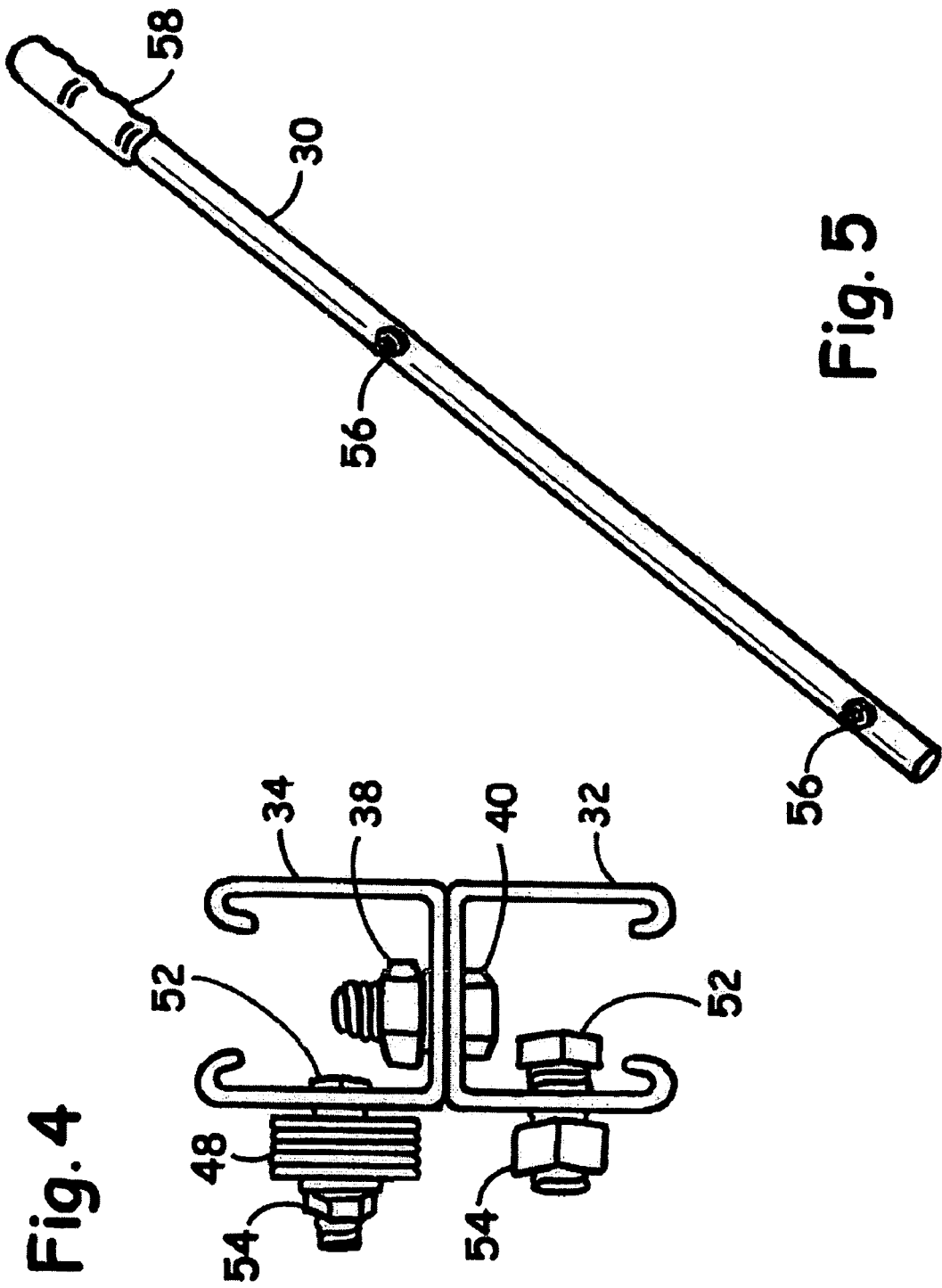

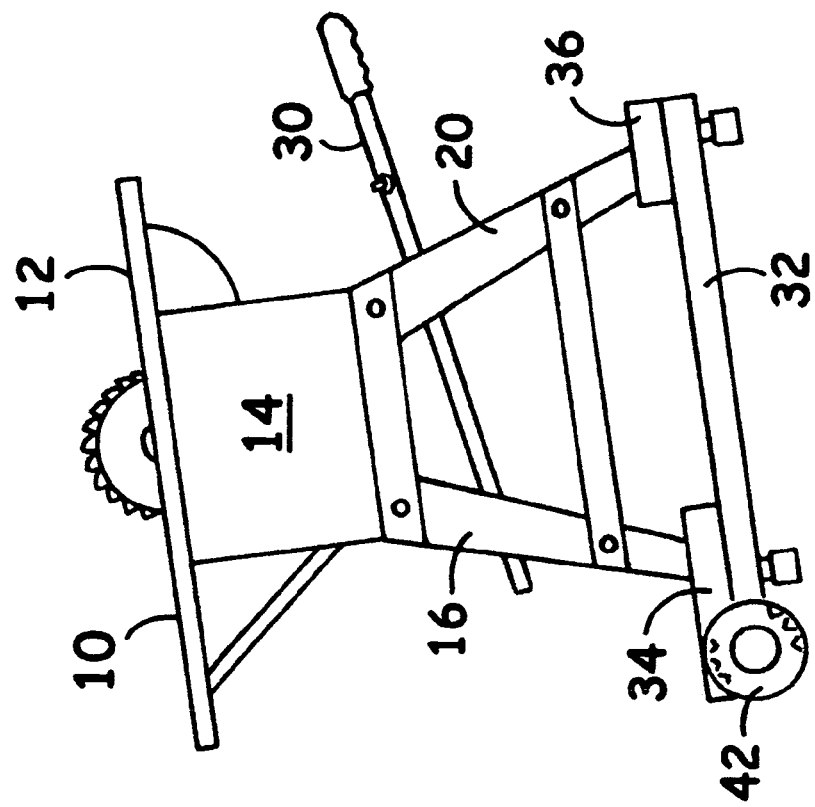
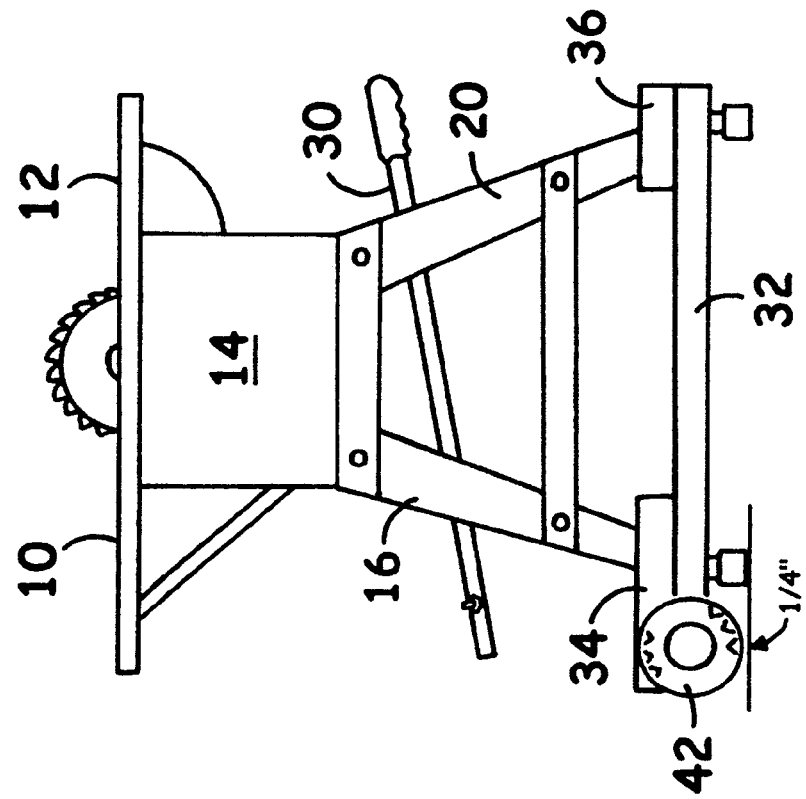
Fig. 9
Fig. 8

PORTABLE TABLE FOR TABLE SAW

BACKGROUND OF THE INVENTION

1. Field of the Invention

The present invention relates to a portable table for a table saw and supported by legs from a floor or ground surface; more particularly, the present invention relates to a pair of horizontal struts that extend across the bottom of the table legs and provide wheels spaced forward of a pair of the legs and slightly above the surface of the ground. Titling means, such as handles, are provided on the table to tilt the table in the direction of the wheels so that the wheels engage the ground and permit the table to be wheeled to a different location.

2. Prior Art

A preliminary patentability search was conducted on this invention and as a result the following patents were uncovered in the search:

| Patent No. | Inventor | Date |
| --- | --- | --- |
| 2,672,349 | Brock | Mar. 16, 1954 |
| 4,230,329 | Johnson | Oct. 28, 1980 |
| 4,969,496 | Romans | Nov. 13, 1990 |
| 4,971,286 | Silhan | Nov. 20, 1990 |
| 5,479,840 | Hilliard et al | Jan. 2, 1996 |
| 5,482,303 | Meloy | Jan. 9, 1996 |
| 5,709,397 | Hall | Jan. 20, 1998 |
| 5,876,173 | English, Jr. | Mar. 2, 1999 |
| 5,957,649 | English, Jr. et al | Sept. 28, 1999 |
| 6,079,931 | English, Jr. et al | Jun. 27, 2000 |
| 6,273,081 B1 | Gorgal et al | Aug. 14, 2001 |
| 6,533,524 B2 | English, Jr. et al | Mar. 18, 2003 |
| 6,659,706 B2 | English, Jr. et al | Dec. 9, 2003 |
| 6,837,665 B2 | English, Jr. et al | Jan. 4, 2005 |

As will appear from an inspection of the above references, there is no patent that shows a table having horizontal strut with wheels mounted to one side of the table and where the wheels are positioned slightly above the surface of the ground (or floor) and whereby tilting the table will cause the wheels to engage the ground.

Many of these patents show tables, wheels and handles, but none show wheels mounted in an offset position with respect to a pair of table legs such that the wheels do not touch the ground in the normal resting position of the table but which, when the table is tilted by lifting on the handles, touch the ground and permit the table to be moved from place to place.

Certain patents such as English Jr., et al., U.S. Pat. No. 6,079,931 show lift dollies for tables using table saws; however, the English Jr., patent involves moveable elements including casters mounted on pivotal frames which can be moved from a non-contacting position into a ground contacting position and which would require a release in order for the casters to return to their non-contacting position.

SUMMARY OF THE INVENTION

The table to which the present invention is applied is one which is designed to support a table saw which may or may not be sold along with the table. The invention itself consists, essentially, of a pair of horizontal or longitudinal struts that extend above the ground or floor and across the lower ends of the legs of the table. On one end of each of the horizontal struts are mounted a pair of wheels which are slightly above ground when the table is standing in its normal condition. Also provided are a pair of horizontally extending handles which are attached to the table just below the upper surface thereof for the purpose of tilting the table when such action is desired.

Thus, the essence of the invention is a pair of wheels which are mounted to one side of the table in a non-touching relation with the ground. When the table is tilted, by lifting up on the handles, the wheels will touch the ground and permit the table to be lifted completely off the ground and wheeled to a convenient location.

BRIEF DESCRIPTION OF THE DRAWINGS

FIG. 4 is an end view taken from FIG. 1.

FIG. 5 is a view of one of the handles attached to the table for tilting the same.

FIG. 8 is a side elevation similar to FIG. 3 showing the table in normal condition with the wheels on the horizontal strut being slightly elevated above the floor.

FIG. 9 is a view similar to FIG. 8 but showing a progression therefrom which involves lifting up on the handles, tilting the table until the wheels are in contact with the ground so that the table can be moved to any convenient location.

DETAILED DESCRIPTION OF THE PREFERRED EMBODIMENTS

Figure 3:
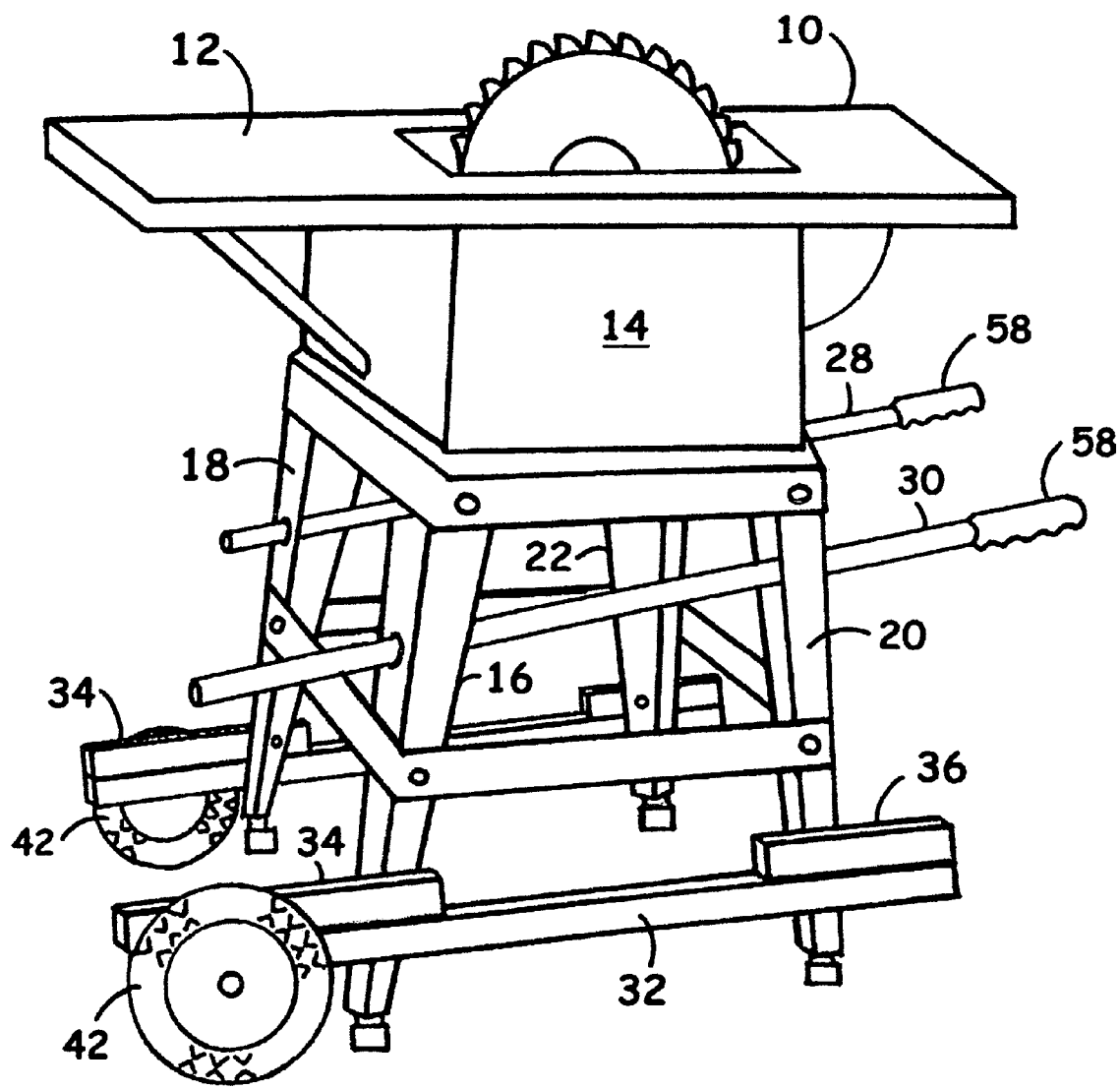
FIG. 3 is a perspective view of the table with the wheels and handles attached.
Figure 7:
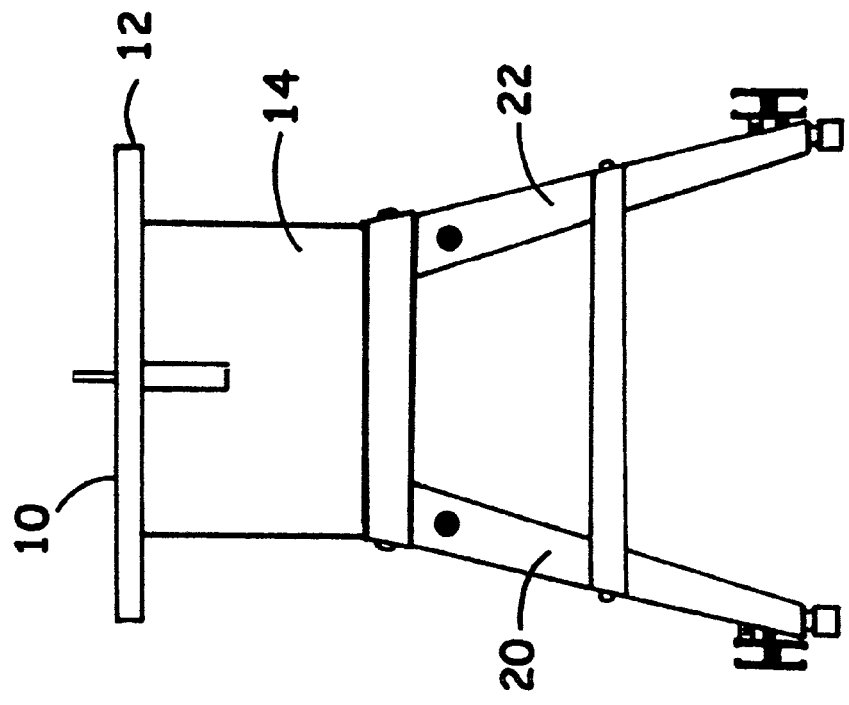
FIG. 7 is a rear view of the table with the wheels totally omitted.
Figure 6:
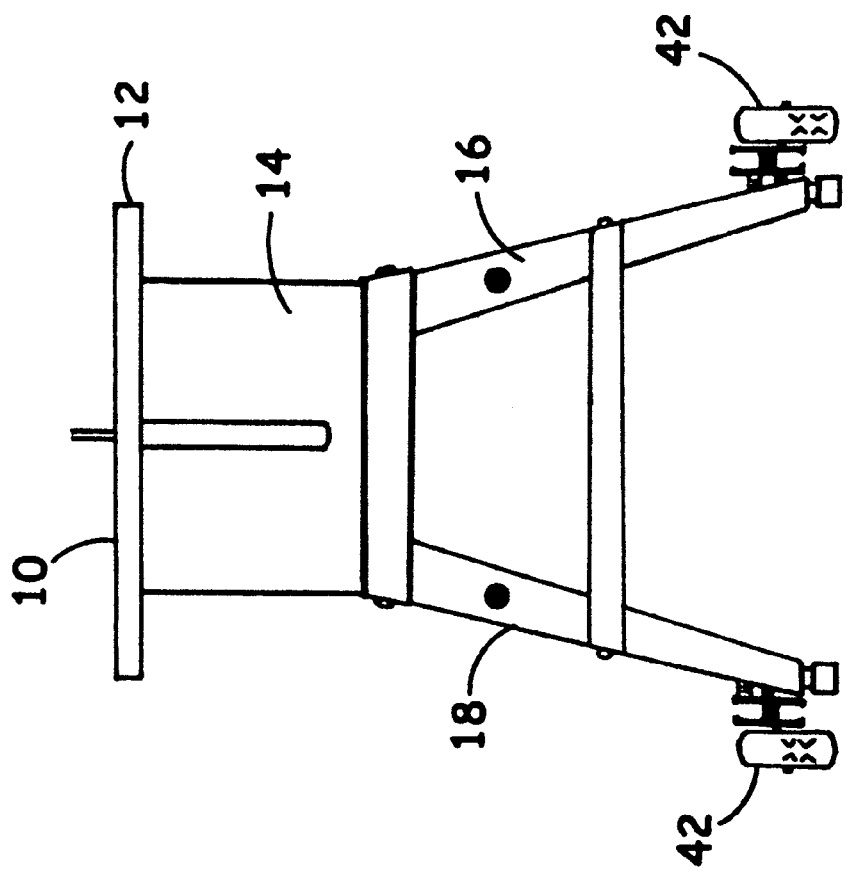
FIG. 6 is a front view of the table to which the horizontal struts are attached but omitting the inside wheels for simplicity.

Referring to the drawings in detail, FIG. 3 shows a table 10 having a flat table top 12 arranged above a base 14. The base 14 is supported from the floor by forward legs 16 and 18 and rear legs 20 and 22, all of which legs are inclined towards the floor from the base 14. A pair of handles extend longitudinally through holes (not referenced) adjacent the upper ends of the table legs 20 and 22 and forward and through holes (not referenced) at a slightly lower location on the front legs 16 and 18. The handles are provided with grips 58.

Figure 1:
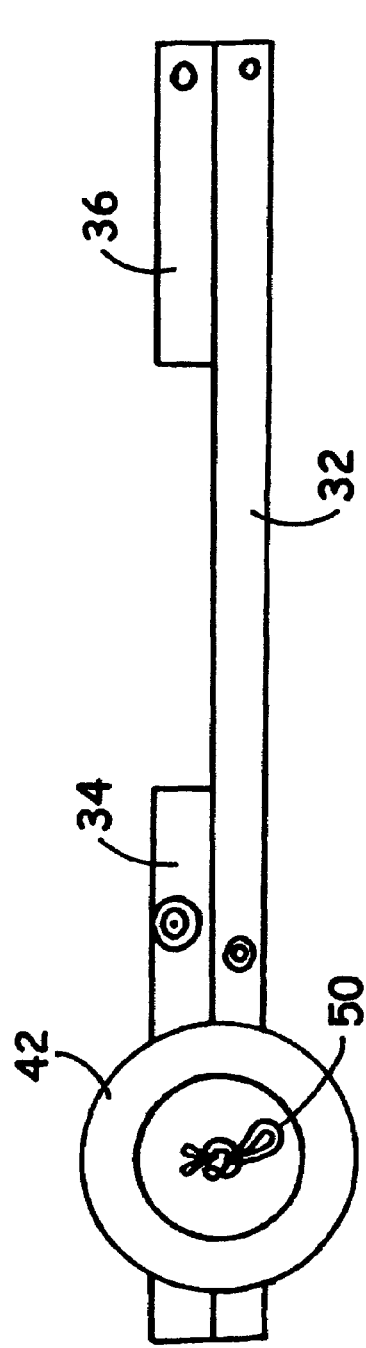
FIG. 1 is a side elevation of one of the longitudinal struts showing a pair (only one wheel in this view) of wheels attached to the remote end of the longitudinal strut.
Figure 2:
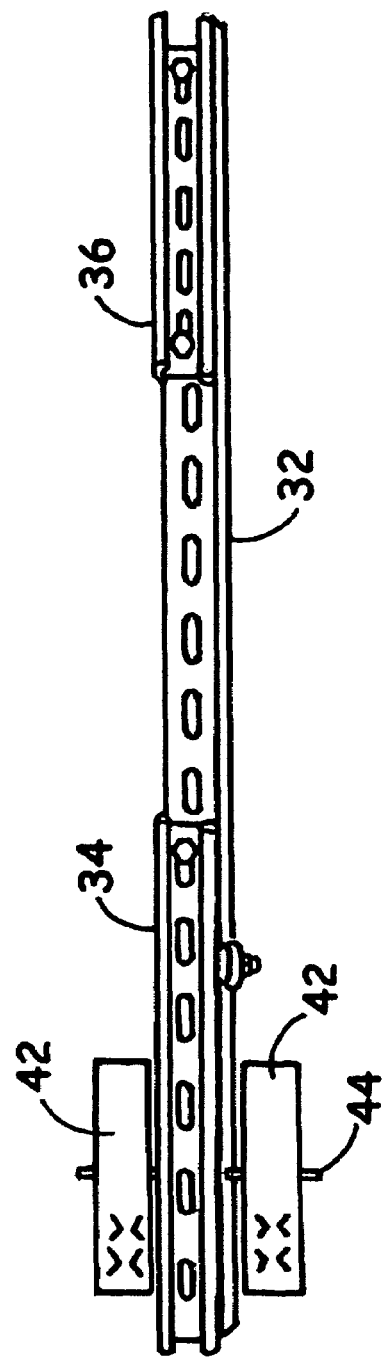
FIG. 2 is a plan view of the elements shown in FIG. 1.

Extending across the bottoms of the table legs are a pair of horizontal struts 32. The struts 32 are downwardly directed channel members; at the left-hand, or forward, end of the strut 32 is a shorter piece 34 of the same kind of channel but directed upwardly so that the webs of the two channels can be secured together by bolt and nuts. At the rear or right-hand end of the strut 32 is mounted another short channel 36 which is also upwardly directed and which is connected to the strut 32 by means of bolts 38 and nuts 40 which go through the webs of the channels. At the left-hand end of the composite struts 32, 34 and 36 are mounted a pair of wheels 42 which are connected through the composite strut by means of axle 44. As best shown in FIG. 1 the wheel 42 is secured to the axle 44 by means of a cotter pin 50.

As best shown in FIG. 4 the upper short channel member 34 is secured to the lower strut 32 by means of nuts 38 and bolts 40. For the purpose of attaching the strut to the legs, horizontal bolts 52 are provided with corresponding nuts 54;

the bolt 52 will extend through a suitable hole at the lower end of table leg 16 or 18. In view of the fact that the legs 16 and 18 are tilted or inclined the upper bolt 52 which extends through the leg 16 or 18 at a location slightly above the location for the previously described bolt 52, a plurality of washers 58 are mounted on the upper bolt 52 to compensate for the taper of the legs. The washers are held in place by means of nuts 54.

As best shown in FIG. 5, the handle 30 is provided with a pair of bolts 56 which are positioned on the handle after it has been inserted through the holes in the legs 16, 18, 20 and 22. The upper bolts 56 will be used in conjunction with the legs 20 and 22 so that the handle can be moved forward and out of position when the table is in condition of repose. The nuts 56, however, will be positioned so that they will come in contact with the legs 16 and 18 when the handles are retracted so as to serve as stops for the handles.

As best shown in FIG. 9, the wheels 42 are positioned slightly above the floor when the table 10 is in its normal position on the floor. However, if it is desired to tilt the table so as to make it portable, the handles 28 and 30 are retracted by pulling them toward the right in FIG. 9 until they assume the position shown in FIG. 10. A lifting effort will be provided on the handles 28 and 30 so that the table 10 will tilt to the position shown in FIG. 10, at which time the wheels 42 will be in contact with the floor and the remainder of the table will be elevated from the floor. At this time the table 10 can be moved to any convenient location.

What is claimed is:

1. A portable table for a table saw wherein the table is provided with an upper support for supporting a table saw thereon, the table being provided with a pair of forward vertical legs extending from the support to the ground, a pair of rear vertical legs extending from the support to the ground, the improvement which comprises a pair of parallel longitudinal struts that extend above the ground and across the lower ends of the legs of the table, a pair of wheels mounted on a pair of ends of the struts and offset from the one side of the table, the wheels having peripheries spaced slightly above the ground when the table is standing in its normal condition of repose, means for titling the table for bringing the wheels in contact with the ground so as to roll the table on the wheels, wherein each of the horizontal struts consists of a lower downwardly directed channel member extending for the full length of the strut and a pair of shorter upwardly directed channel members mounted at the opposite ends of each lower channel member, the three channel members of each strut being bolted together along intermating webs of the channels.

2. The improvement according to claim 1 wherein each strut is provided with means at an opposite end of each downwardly directed channel member to bolt the strut to the lower ends of the table legs and wherein means are provided on the shorter upwardly directed channel members of each strut to bolt the shorter channel members to the lower ends of the table legs with washers being provided in the event that the table legs are other than vertical.

\* \* \* \* \*